United States Patent [19]
Kotera et al.

[11] 4,090,243
[45] May 16, 1978

[54] COLOR SEPARATING METHOD AND APPARATUS USING STATISTICAL TECHNIQUES

[75] Inventors: Hiroaki Kotera; Heijiro Hayami; Hiroyoshi Tsuchiya; Ryuzo Kan; Kunio Yoshida; Tsutomu Shibata; Yukifumi Tsuda, all of Kawasaki, Japan

[73] Assignee: Matsushita Electric Industrial Company, Limited, Japan

[21] Appl. No.: 683,657

[22] Filed: May 6, 1976

[30] Foreign Application Priority Data

May 8, 1975 Japan .................................. 50-55829

[51] Int. Cl.² ............................ G01V 7/06; G01J 3/46
[52] U.S. Cl. ................................... 364/526; 354/102; 356/195; 364/554; 364/717
[58] Field of Search ........................... 235/151.3, 152; 354/100, 102; 355/4, 32; 350/321; 356/173, 195; 340/172.5; 445/1

[56] References Cited

U.S. PATENT DOCUMENTS 3,527,523  9/1970  Travis .................................. 354/102
3,919,530  11/1975  Cheng ................................ 235/151.3

OTHER PUBLICATIONS

Methven, R. A. H.; "Color Scanning System;" IBM Tech. Disclosure Bulletin; vol. 15, No. 2, Jul. 1972, pp. 458-459.
Matthens, S. B.; "Generation of Pseudorandom Noise Having a Gaussian Spectral Density;" IEEE Transactions on Computers; Apr., 1968, pp. 382-385.

Primary Examiner—Malcolm A. Morrison
Assistant Examiner—Errol A. Krass
Attorney, Agent, or Firm—Robert E. Burns; Emmanuel J. Lobato; Bruce L. Adams

[57] ABSTRACT

A color print painted with different colors $C_i$ ($i = 1, 2 \ldots n$) is scanned by a color scanner along a plurality of successive line paths to generate a set of electrical signals each representing the intensity of the spectral components of the light reflected from an elemental area of the print. A macroscopic color separator is provided to generate a set of electrical signals each representing the average spectral intensities per unit area of the print. A data processor is used to compute the probability $P(C_i)$ from the data obtained from the macroscopic color separator and a set of mean spectral intensities exhibited by the color samples with which the print is painted by artisans. In accordance with the Bayes' Rule, the processor then executes computation of the product of $P(C_i)$ and the conditional probability of occurrence of elemental color spectral intensities given that the elemental area being scanned belongs to a particular color sample, using the data received from the color scanner as it scans the print.

22 Claims, 17 Drawing Figures

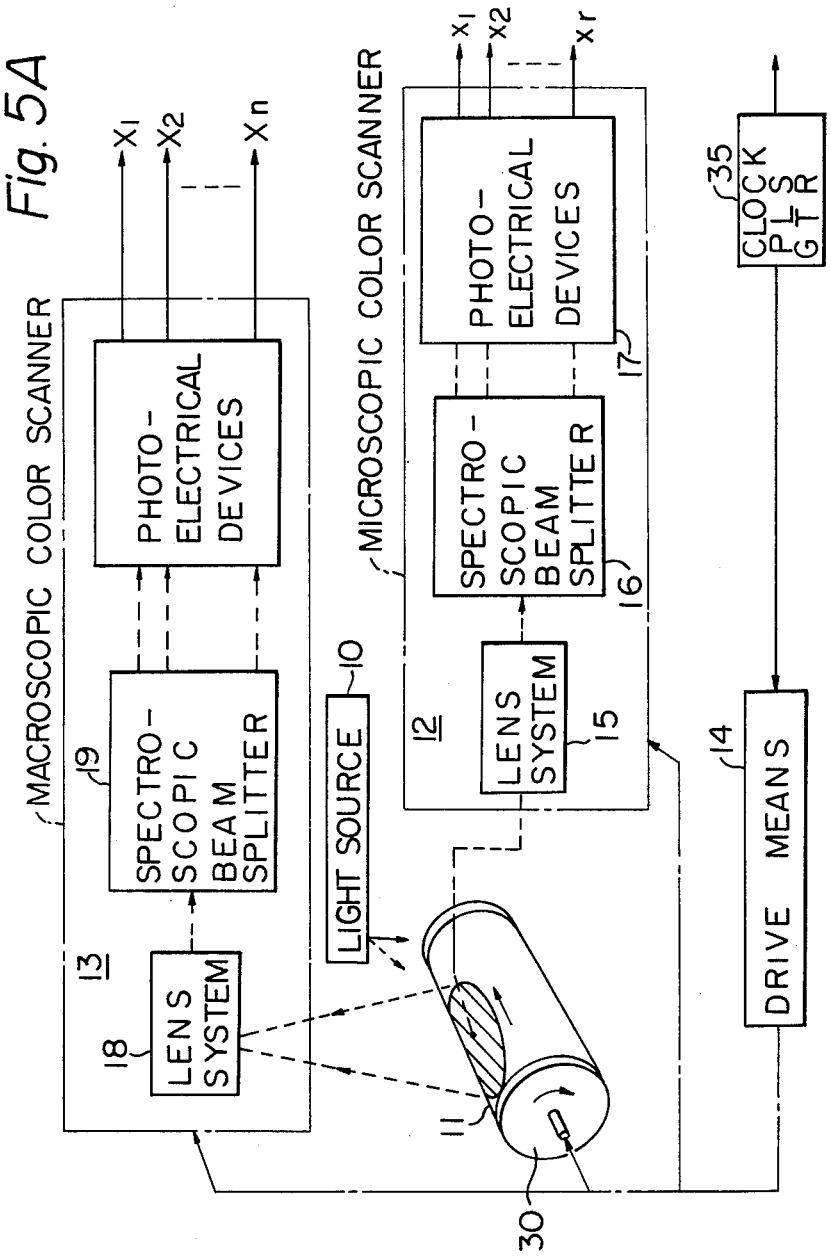

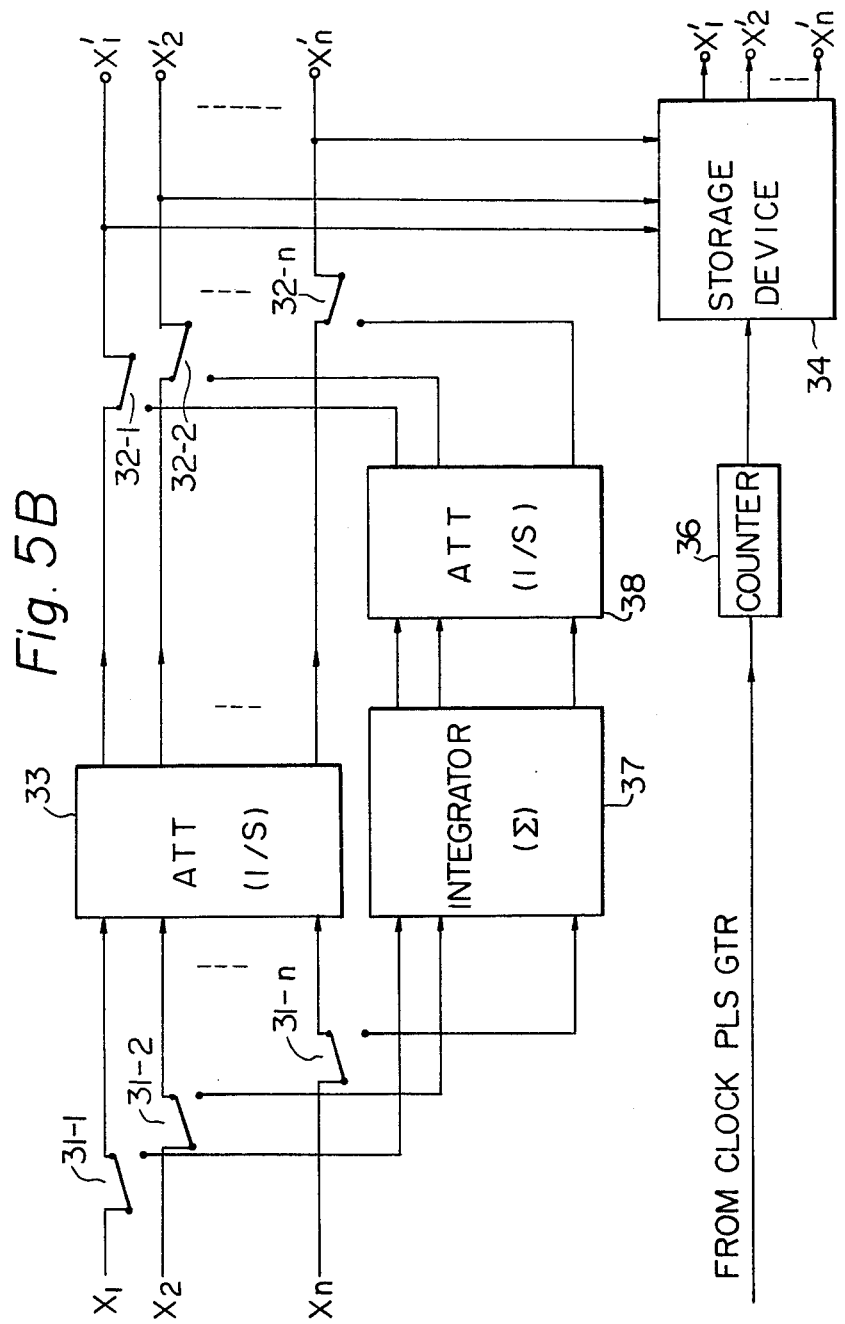

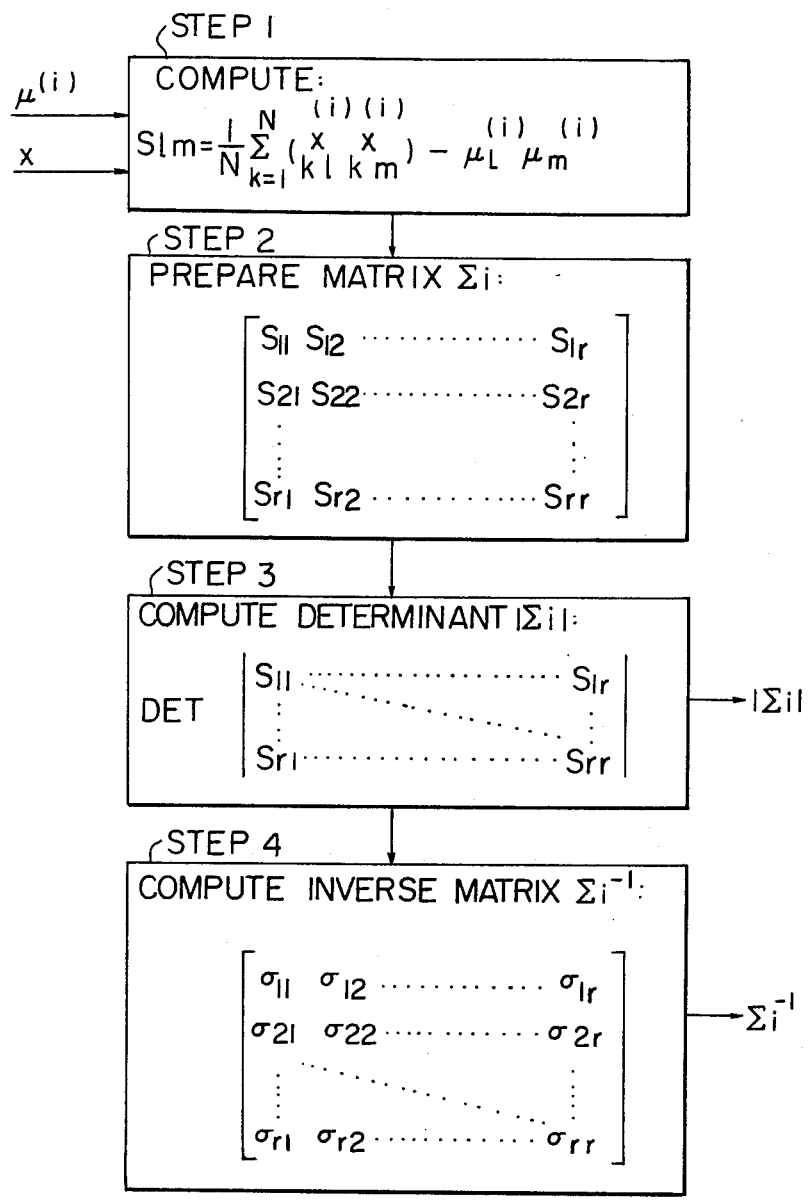

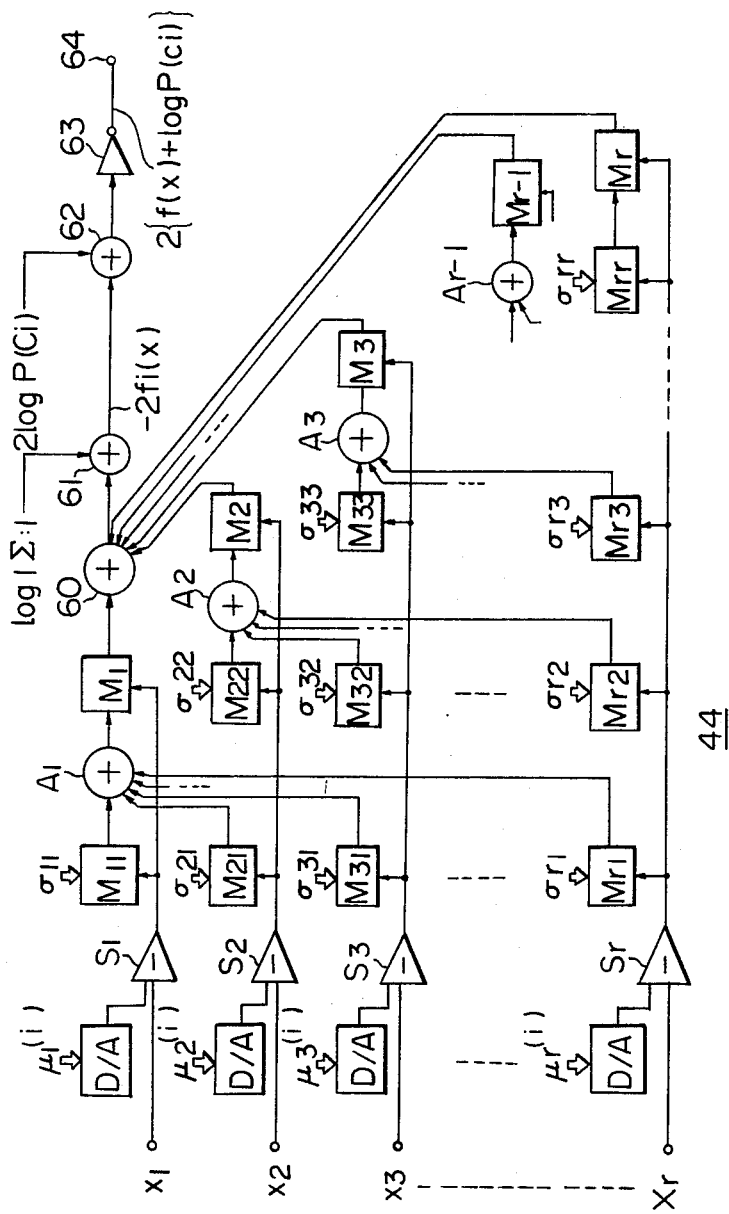

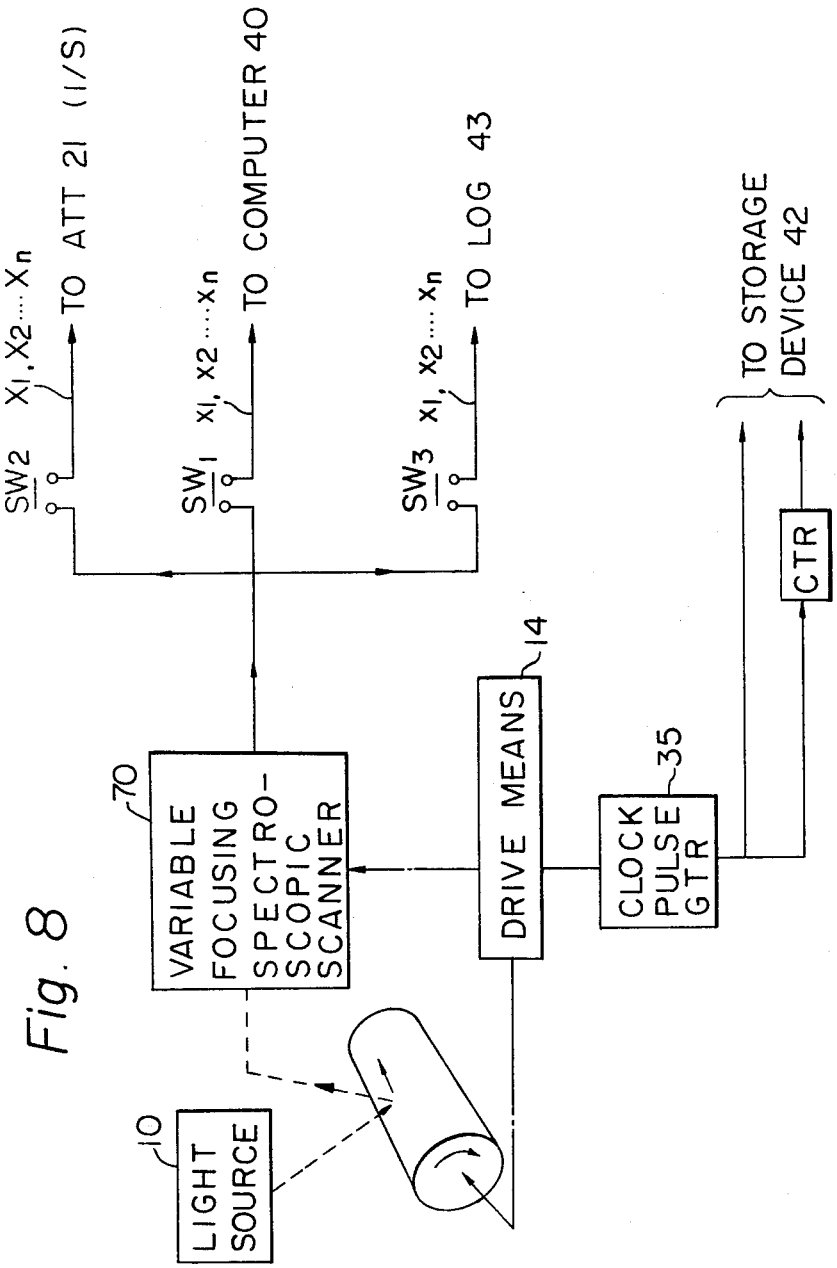

COLOR SEPARATING METHOD AND APPARATUS USING STATISTICAL TECHNIQUES

BACKGROUND OF THE INVENTION

The present invention relates generally to color separating systems, and in particular to a method and an apparatus for separating the colors of an original print painted with a number of predetermined colors. More particularly, the invention relates to a method and an apparatus for separating the colors using probability and statistical data handling techniques for eliminating errors arising from the ambiguous color spectral information.

In a prior art color separator, the spectral information of a color is spectroscopically separated into a number of predetermined spectral components and compared with a set of reference values to determine the degree of similarity therebetween. However, when the original color print is painted by color samples prepared by artisans, there is a certain degree of irregularities in the thickness of color print, uneven quantities of compositions in each color sample and possible color overlapping in the print. This would result in ambiguity in the tint, hue and brightness information, and as a result the separator tends to recognize erroneously when encountered with such ambiguous colors.

SUMMARY OF THE INVENTION

Therefore, the primary object of the present invention is to provide an improved method and apparatus for separating the colors of a print in which probability and statistical data handling techniques are used to recognize the colors with a high degree of certainty.

The present invention is based on the assumption that the colors of a print observed in terms of their spectral reflectivities can be identified with the highest degree of certainty by two probabilities: one is the probability of occurrence of each color as the print is scanned across its surface and the other is the probability that an observed color spectral component corresponds to a particular color sample. Assume that the color print is painted with "n" distinct color samples (#1, #2 ... #n), and let "$C_i$" denote each color sample where "i" ranges from unity to "n" and "x" denote the observed value of spectral reflectivity of a given color of the print, the former probability is denoted by $P(C_i)$, while the latter is a conditional probability density function $p(x|C_i)$. According to Bayes' Rule the product $P(C_i)p(x|C_i)$ equals the joint probability density $p(x, C_i)$ which is the probability of simultaneous occurrence of "x" and "$C_i$". Therefore, the observed elemental or dot area can be regarded as being painted with a color which belongs to color sample "$C_i$" with the highest degree of certainty when a color sample $C_i$ is detected which maximizes the value of $P(C_i)p(x|C_i)$.

The apparatus of the invention generally comprises a microscopic color scanner, a macroscopic color separator and a data processing unit. The microscopic color scanner scans along a plurality of line paths within the print to collect light from an elemental or dot area at a given instant of time and separates the collected light into a plurality of spectral components to generate a set of electrical signals each representing the intensity of each separated spectral component. The macroscopic separator collects light from the entire area or at least a part of the area which encompasses a plurality of such elemental areas and separates the collected light into a plurality of spectral components to generate a set of electrical signals each representing the intensity of each spectral component. Each of the macroscopically generated signals is an integration of each of the microscopically generated signals. The average intensity of a given dot area is given by $$\sum_{i=0}^{n} P(C_i) \cdot \mu_j^{(i)},$$

where $\mu_j^{(i)}$ is the mean value of a spectral component "j" of a color sample "i". A set of mean values $\mu_j^{(i)}$ is a set of spectral reflectivities exhibited by a color sample "i" and the intensity of each spectral component of the actual color dot found along the scanned line paths varies in accordance with the conditional probability density function $p(x|C_i)$. The macroscopically generated signals are divided in magnitude by the size of the area from which the signals are obtained in order to generate a set of signals each representing the intensity of a spectral component per unit area. Since each of the per-unit area representative signals is of equal value to the average intensity of each spectral component of a given dot area, the probability $P(C_i)$ can be obtained from the set of mean values $\mu_j^{(i)}$ and the per-unit area representative signals. The processing unit executes the computation of $P(C_i)$ from the inverse matrix of $\mu_j^{(i)}$ multiplied by a set of per-unit area representative signals. The conditional probability density function $p(x|C_i)$ is an unbiased estimator which can be used for any color pattern as long as the same color samples are employed. The data processor then accepts the microscopically obtained data as the print is scanned to compute the product $P(C_i)p(x|C_i)$ and detects $C_k$ which maximizes the value of the product to generate an output indicating that the dot area being scanned is painted with the color which belongs to color sample $C_k$.

Therefore, an object of the invention is to provide a method and an apparatus for detecting a color sample that maximizes the joint probability using statistical data collected from an elemental area of the print and a larger area encompassing a plurality of such elemental areas within a short interval of time before the point of observation is shifted successively to the next.

BRIEF DESCRIPTION OF THE DRAWINGS

These and other objects, features and advantages of the invention will be understood from the following description taken in conjunction with the accompanying drawings, in which:

FIGS. 5A and 5B are a modification of the embodiment of FIG. 1;

FIG. 7A is a flow chart showing the process steps required to perform computation of the data used in the embodiment of FIG. 6;

FIG. 7B is an analog computing circuit used in the circuit of FIG. 6 to compute $P(C_j)p(x|C_j)$;

FIG. 8 is a modification of the embodiment of FIG. 6; and

DESCRIPTION OF THE PREFERRED EMBODIMENTS

Figure 1A:
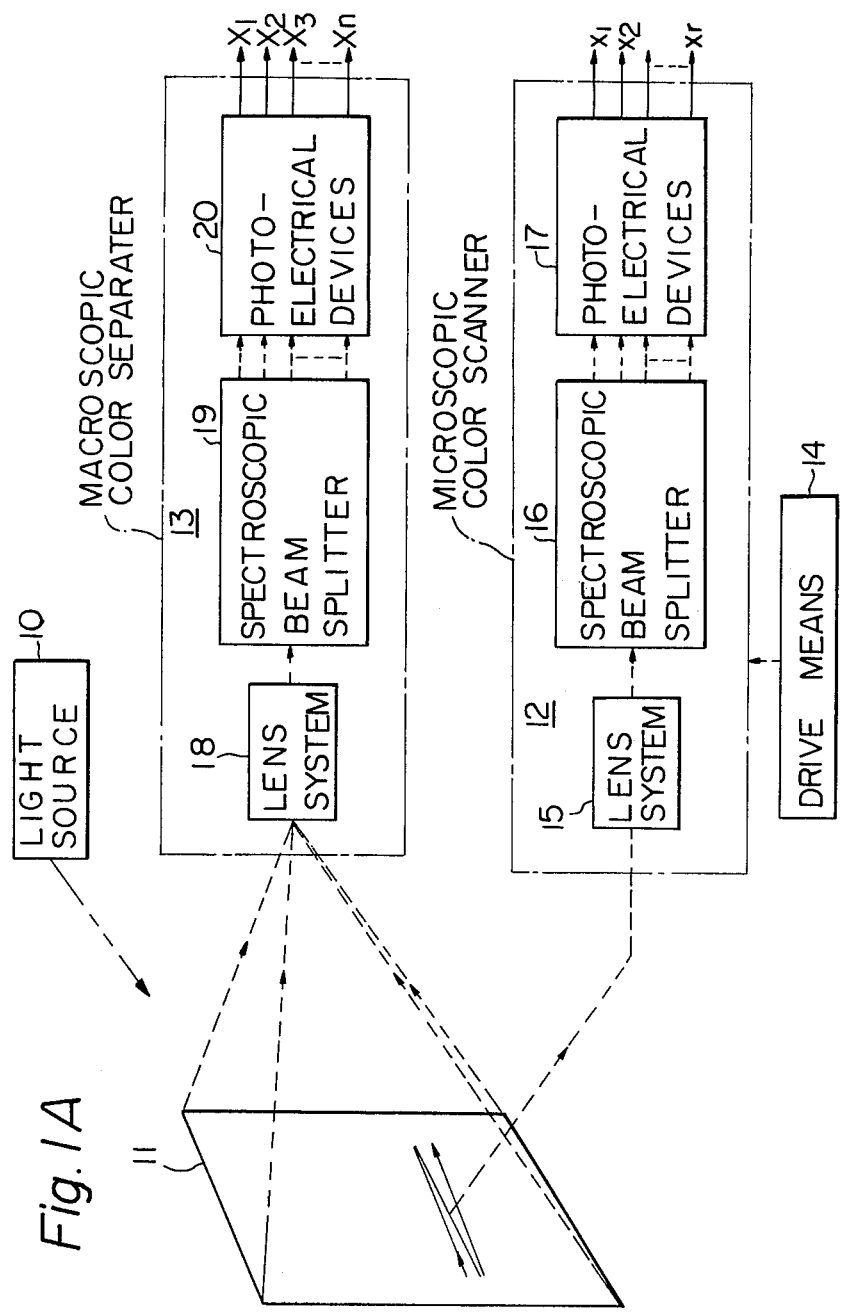
FIG. 1A and 1B show an embodiment of the invention in schematic form.
Figure 9B:
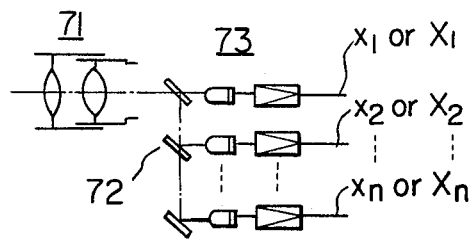
FIG. 9A and 9B show details of the scanners used in the embodiments of the invention.
Figure 9A:
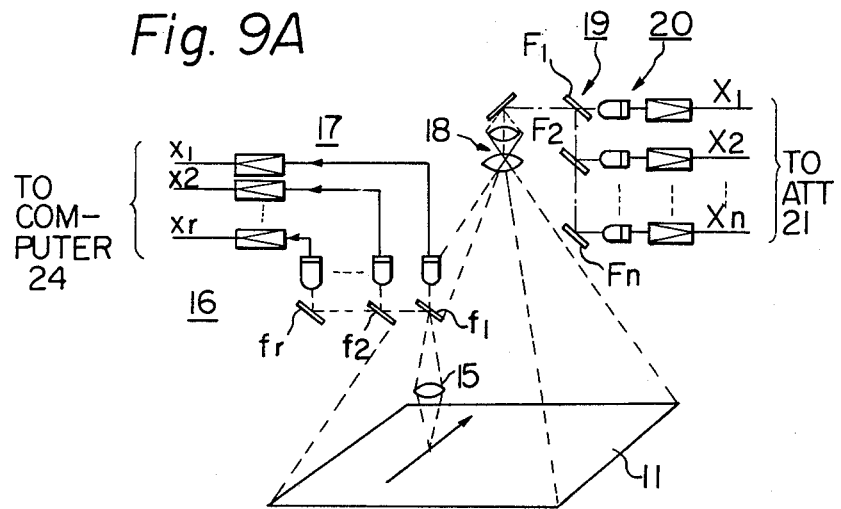

Referring now to FIG. 1, an embodiment of the present invention is schematically shown. In FIG. 1A, the apparatus of the invention comprises generally a light source 10 for illuminating a color print 11, a microscopic color scanner 12, a macroscopic color separator 13, and drive means 14 which drives the microscopic color scanner 12 to scan across the surface of the print 11. Scanner 12 comprises a lens system 15 which collects light from an elemental area along the scanned line and passes the collected light to a spectroscopic beam splitter 16 which in turn separates the collected light beam into spectral components $\lambda_1, \lambda_2 \ldots \lambda_r$ each of which may be a spectral line or a cluster of spectral lines. The beam splitter 16 is comprised of a plurality of color filters $f_1, f_2 \ldots f_r$ arranged as shown in FIG. 9A and passes the separated light beams to photoelectrical devices 17 equal in number to the separated light beams to detect the spectral intensity of each light beam producing a set of corresponding electrical signals $(x_1, x_2 \ldots x_r)$.

Figure 2:
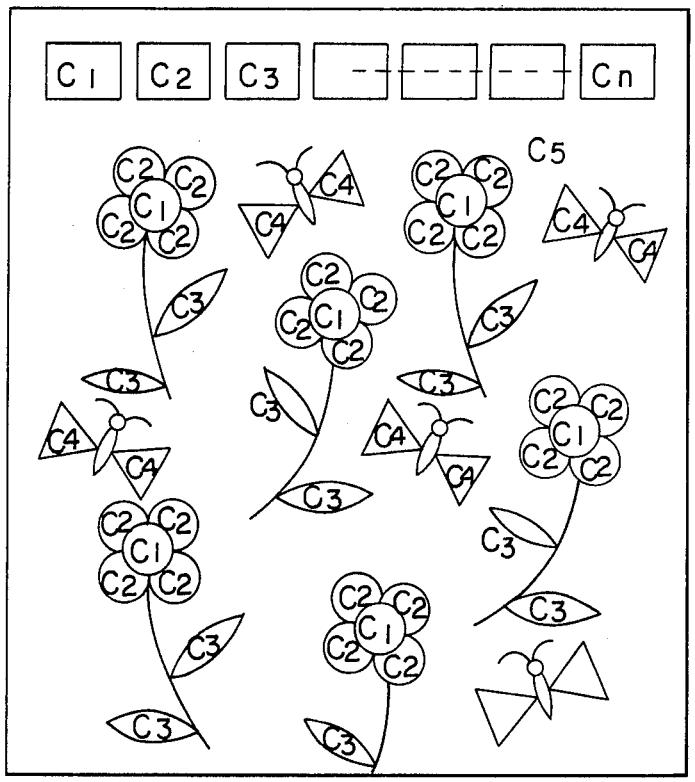
FIG. 2 is a color print painted with "n" different colors useful for description of the invention.
Figure 3:
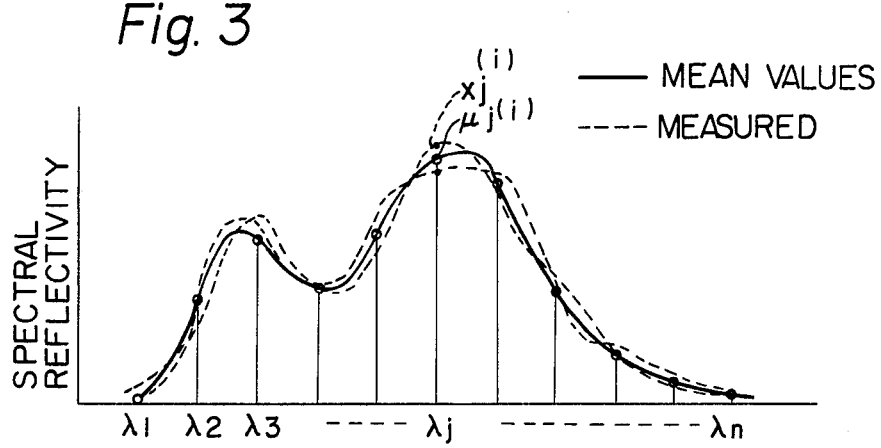
FIG. 3 is a graphic illustration of the spectral reflectivity distribution of a given sample point on the print of FIG. 2.

The print 11 is painted with "$n$" different colors $C_1, C_2 \ldots C_n$ by artisans as shown in FIG. 2. Because of the ambiguous nature of the spectral information derived from each elemental area of the print, the observed spectral reflectivities are considered as a set of random variables which distribute about a set of mean values $\mu_1^{(i)}, \mu_2^{(i)} \ldots \mu_r^{(i)}$ as shown in FIG. 3 where $i$ ranges from unity to $n$. Color samples $C_1, C_2 \ldots C_n$ are attached to the print. These samples are carefully painted with respective colors such that each possesses a set of means values, for example, color sample $C_1$ possesses a set of mean values $\mu_1^{(1)}, \mu_2^{(1)} \ldots \mu_r^{(1)}$, and so on, as clearly shown in FIG. 4A.

As the microscopic color scanner 12 scans across the surface of print 11, each of the colors $C_1$ to $C_n$ is assumed to occur with the probability $P(C_j)$, which is, otherwise stated, a probability that the color encountered belongs to a color sample $C_j$.

Consideration is now given to the conditional probability density function $p(x|C_j)$ of a set of observed values $x_1$ to $x_r$ given that the observed values belong to a color sample $C_j$. Let $x^{(i)}$ denote a color signal vector belonging to a color sample $C_j$, then $x^{(i)}$ is written as a vector of "$r$" dimensions $$x^{(i)} = (x_1^{(i)}, x_2^{(i)} \ldots x_r^{(i)}) \tag{1}$$

then the mean vector of $x^{(i)}$ is given by $$\overline{x^{(i)}} = \mu^{(i)} = (\mu_1^{(i)}, \mu_2^{(i)} \ldots \mu_r^{(i)}) \tag{2}$$

The observed spectral intensities $x^{(i)}$ therefore have a distribution in accordance with the conditional probability density function $p(x|C_j)$ with a set of mean values $\mu^{(i)}$.

The macroscopic color separator 13, on the other hand, comprises a lens system 18 which collects light from the entire area of the print 11 and passes the collected light to a spectroscopic beam splitter 19 having a plurality of color filters $F_1, F_2 \ldots F_n$ equal in number to the color samples, so that the beam splitter 19 separates the beam into "$n$" spectral components at wavelengths $\lambda'_1, \lambda'_2, \ldots \mu'_n$ (FIG. 9A). A plurality of photoelectrical devices 20 receives the separated light beams to convert into corresponding electrical signals $X_1, X_2, \ldots X_n$. It may be noted that each of these signals $X_1$ to $X_n$ is an integration of the intensities of the same components collected from the elemental areas.

Figure 1B:
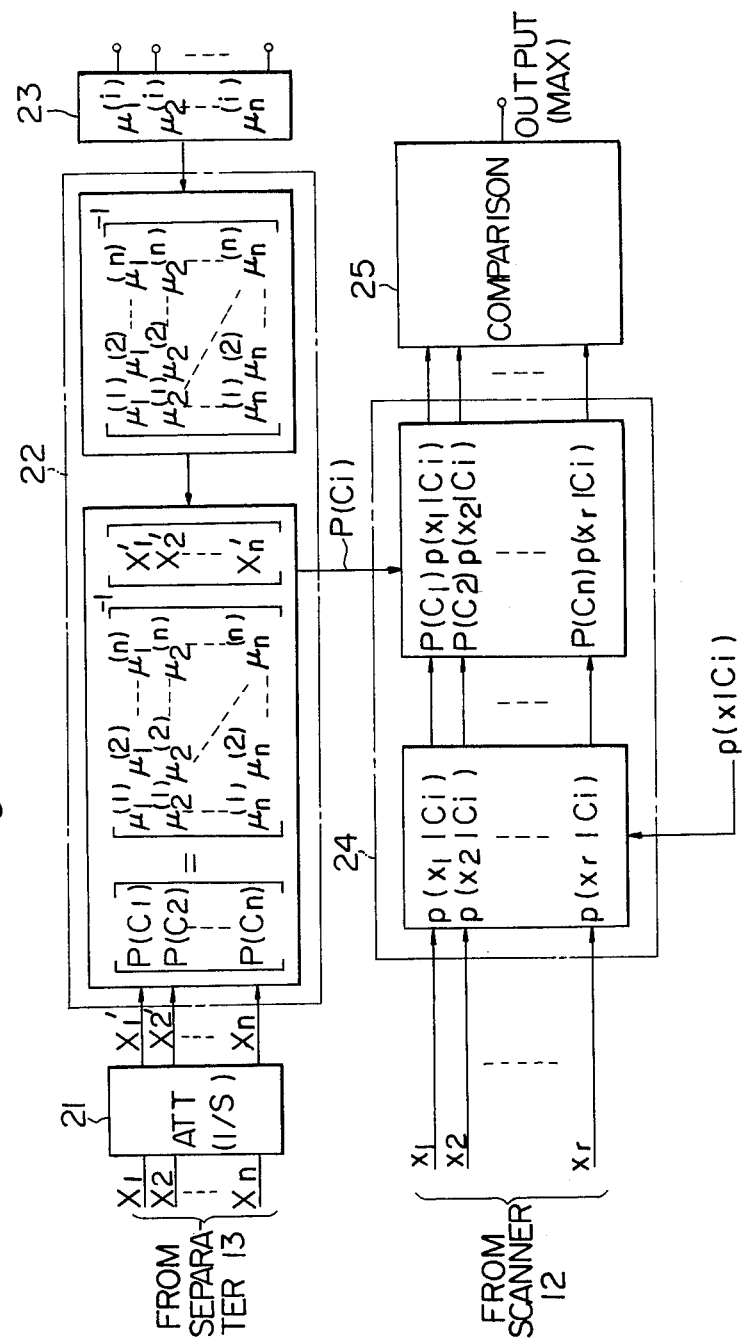

Referring to FIG. 1B, an attenuator 21 is connected to the output of the macroscopic analyzer 13 to receive the signals $X_1$ to $X_n$ to provide demultiplication of the input signals by the entire area (S) of the print 11 to provide a set of output signals $X'_1, X'_2 \ldots X'_n$ each representing the spectral intensity per unit area of the print. Therefore, $$X_j = \int_S x_j ds \tag{3}$$

where $j$ ranges from unity to $n$.

$$X'_j = \frac{1}{S} X \tag{4}$$

From the foregoing discussion it follows that the mean value of the spectral intensity of a given point of observation is given by $$x_j = P(C_1) \mu_j^{(1)} + P(C_2) \mu_j^{(2)} + \ldots + P(C_n) \mu_j^{(n)}$$

$$\overline{x}_j = P(C_1) \mu_j^{(1)} + P(C_2) \mu_j^{(2)} + \ldots + P(C_n) \mu_j^{(n)}$$

$$= \sum_{i=1}^{n} P(C_i) \mu_j^{(i)} \tag{5}$$

Since each of the spectral intensities per unit area represented by signals $X'_j$ to $X'_n$ equals the mean spectral intensity of a given point sampled by the microscopic scanner 12, the following Equations hold:

$$\overline{x}_j = X'_j \tag{6}$$

$$\begin{rcases} X'_1 = P(C_1) \mu_1^{(1)} + P(C_2) \mu_1^{(2)} + \ldots + P(C_n) \mu_1^{(n)} \\ X'_2 = P(C_1) \mu_2^{(1)} + P(C_2) \mu_2^{(2)} + \ldots + P(C_n) \mu_2^{(n)} \\ \vdots \\ X'_n = P(C_1) \mu_n^{(1)} + P(C_2) \mu_n^{(2)} + \ldots + P(C_n) \mu_n^{(n)} \end{rcases} \tag{7}$$

In the matrix notation, Equation 7 is given by $$\begin{pmatrix} X'_1 \\ X'_2 \\ \vdots \\ X'_n \end{pmatrix} = \begin{pmatrix} \mu_1^{(1)} & \mu_1^{(2)} & \ldots & \mu_1^{(n)} \\ \mu_2^{(1)} & \mu_2^{(2)} & \ldots & \mu_2^{(n)} \\ \vdots & & & \vdots \\ \mu_n^{(1)} & \mu_n^{(2)} & \ldots & \mu_n^{(n)} \end{pmatrix} \begin{pmatrix} P(C_1) \\ P(C_2) \\ \vdots \\ P(C_n) \end{pmatrix} \tag{8}$$

Therefore, probabilities $P(C_1), P(C_2) \ldots P(C_n)$ can be obtained by $$\begin{pmatrix} P(C_1) \\ P(C_2) \\ \vdots \\ P(C_n) \end{pmatrix} = \begin{pmatrix} \mu_1^{(1)} \mu_1^{(2)} \cdots \mu_1^{(n)} \\ \mu_2^{(1)} \mu_2^{(2)} \cdots \mu_2^{(n)} \\ \vdots \quad \vdots \quad \ddots \quad \vdots \\ \mu_n^{(1)} \mu_n^{(2)} \cdots \mu_n^{(n)} \end{pmatrix}^{-1} \cdot \begin{pmatrix} X'_1 \\ X'_2 \\ \vdots \\ X'_n \end{pmatrix} \quad (9)$$

The signals $X'_1$ to $X'_n$ from the attenuator 21 are applied to the first inputs of a computing circuit 22 which may be a general-purpose computer MODEL-II manufactured by Data General Inc., to which is also applied through the second inputs a set of mean values $\mu_1^{(i)}$ to $\mu_n^{(i)}$ which have been derived from each color sample and stored in memory 23. The circuit 22 first computes the inverse matrix of $\mu$ values and then computes $P(C_i)$ in accordance with Equation 9.

The probability $P(C_i)$ can thus be obtained uniquely from Equation 9 since the simultaneous linear equations of Equation 7 can be regarded as being linearly independent. Otherwise stated, the mean values $\mu_j^{(i)}$ are so selected that they satisfy the regular matrix requirement:

$$\begin{vmatrix} \mu_1^{(1)} \mu_1^{(2)} \cdots \mu_1^{(n)} \\ \mu_2^{(1)} \mu_2^{(2)} \cdots \mu_2^{(n)} \\ \vdots \quad \vdots \quad \ddots \quad \vdots \\ \mu_n^{(1)} \mu_n^{(2)} \cdots \mu_n^{(n)} \end{vmatrix}$$

It is important to note that since there must be a set of "$n$" linearly independent equations to determine $P(C_i)$, the beam splitter 19 must separate the incident light into a set of "$n$" spectral components.

The microscopic spectral data $x_1, x_2, \ldots x_r$ are fed into a computing circuit 24 which also receives a signal representing the conditional probability density function $p(x|C_1)$ and the output from the circuit 22. The conditional probability density function is primarily determined by the compositions of paint, the material of the paper on which the image pattern is painted, and the thickness of the paint material which may vary from point to point, all of which may be collected as microscopic statistical data from the scanner 12 before the computing circuit 24 receives signals $x_1$ to to $x_r$ from the scanner 12. Therefore, the conditional probability density function can be considered as being an unbiased estimator so that it can be used for any design pattern as long as the same color samples are employed once the mean values are determined for a set of color samples. Therefore, the signal representing $p(x|C_i)$ is supplied from an external source (not shown) in which the mean values are prepared and stored in advance using the statistical data handling technique.

The circuit 24 first provides substitution of $x_1$ to $x_r$ for $x$ and then provides computation of the products $P(C_1)p(x|C_i), P(C_2)p(x|C_i), \ldots$ and so on. The results of the computation are applied to a comparator 25 which detects a particular color sample $C_k$ which maximizes the product $P(C_i)p(x|C_i)$ so that the apparatus recognizes that a set of signals $x_1$ to $x_r$ derived from a given point of observation from the microscopic scanner 12 belongs to the color sample $C_k$ and presents a signal on its output to indicate that the sampled point is painted with color $C_k$.

Figure 4A:
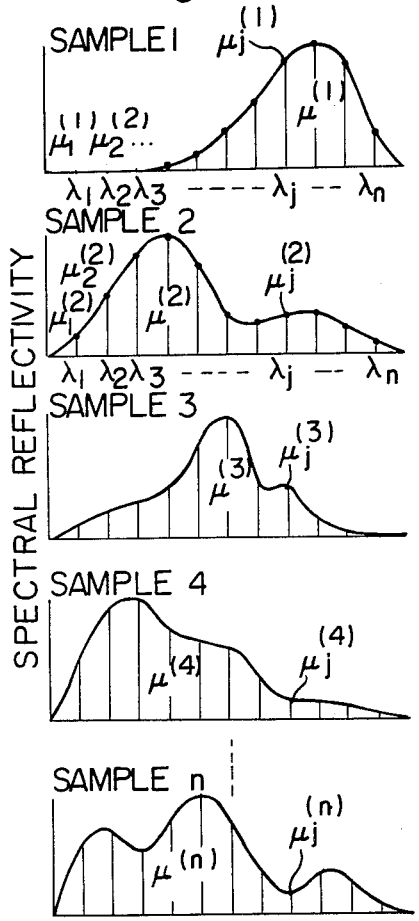
FIG. 4A is a graphic illustration of the spectral reflectivity distributions obtained from "n" color samples.
Figure 4B:
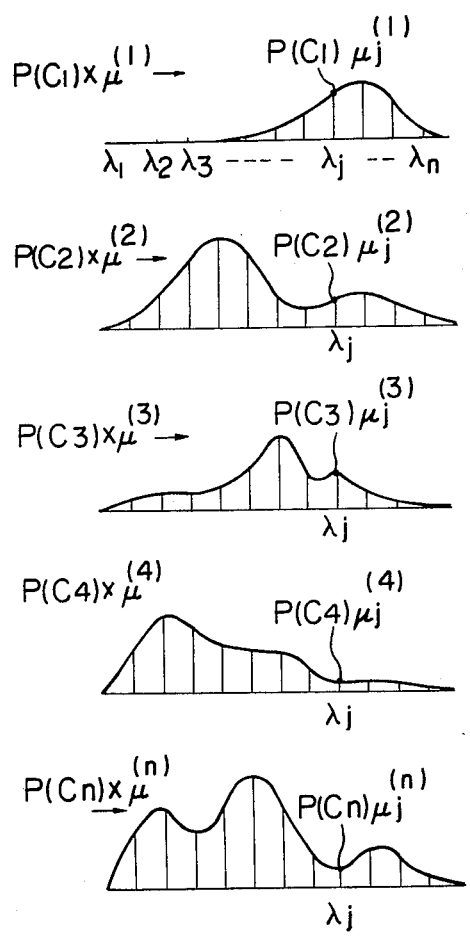
FIG. 4B is a graphic illustration of the mean spectral reflectivity distribution multiplied respectively by the probability $P(C_i)$.
Figure 4C:
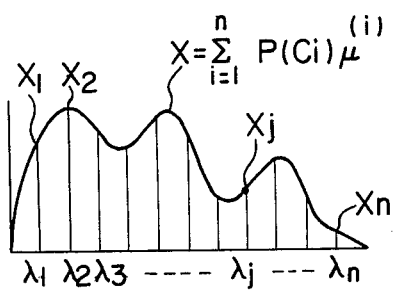
FIG. 4C is a graphic illustration of the summation of the multiplied spectral distributions of FIG. 4B.

FIGS. 4A to 4C are presented for better understanding of the present invention. FIG. 4A shows the mean spectral reflectivity distribution of color samples #1, #2 ... #$n$ and FIG. 4B illustrates the product of the means distribution of FIG. 4A and $P(C_i)$ as given in Equation 5. FIG. 4C depicts the integration of the terms of Equation 5 which corresponds to the signals $X_1$ to $X_n$ supplied from the macroscopic separator 13.

A set of mean values shown in FIG. 4A can be obtained by placing the color print 11 relative to the microscopic color scanner 12 and operating it to collect spectral data from color samples $C_1$ to $C_n$ if they are attached thereto The collected data from each sample is selectively filtered to produce a set of "$n$" spectral components of the same light wavelength as the spectral components $X_1$ to $X_n$ obtained from the macroscopic color separator 13. Since the color samples are carefully painted so as to serve as a standard, the spectral intensity of the filtered components is assumed to take the mean calues so that a set of mean values $\mu_1^{(1)} \ldots \mu_1^{(n)}$ to a set of mean values $\mu_n^{(1)} \ldots \mu_n^{(n)}$ are obtained from the color samples $C_1$ to $C_n$ respectively. If color samples are not provided, the microscopic scanner 12 is operated so as to collect spectral data from a plurality of areas painted with a same color. The collected data are filtered to produce a set of "$n$" spectral components. Since the spectral data collected from such painted areas tend to differ from the mean values as indicated by the dottle-line curve of FIG. 3, the data are mathematically manipulated with the aid of a computer to produce a set of mean values for the associated color. This process will be repeated a number of times equal to the number of colors.

To provide accurate macroscopic data to determine the probability $P(C_i)$, an arrangement shown in FIG. 5 is appropriate. In FIG. 5A, the print 11 is rolled around a revolving drum 30 which is driven by the drive means 14 in synchronism with each line scan to successively shift the scan line to the next. The lens system 18 of the macroscopic color scanner 13 is adjusted so that it collects light from a limited area which encompasses a plurality of elemental areas from which microscopic data is obtained. This narrowing of the macroscopic area serves to collect more valid statistical data for the events in the neighborhood of the sample point, and is particularly advantageous for such prints where the image pattern is remarkably different from one area to another. In the illustrative embodiment of FIG. 5, the macroscopic scanner 13 is driven by the drive means 14 instead of being held stationary as illustrated in the previous embodiment, so that the area from which the macroscopic data is collected is shifted successively until the entire area of the print is scanned. The signals from the macroscopic color scanner 13 are then applied through a set of mode selector switches 31-1, 32-2 . . . 31-$n$ to an attenuator 33 which provides demultiplication of the input values by the size of the area (S') from which the data is collected macroscopically (FIG. 5B). The apparatus can be operated on a real-time basis or on a non-real time basis. In the real-time operation, the two scanners 12 and 13 are simultaneously driven to generate the macroscopic data simultaneously with the generation of the microscopic data. In this case the signals from the attenuator 33 are directly applied to the computing circuit 22. In the non-real time operation, the macroscopic scanner 13 is driven first to generate the data required to obtain $P(C_i)$ in advance of the generation of the microscopic data. In the latter case, the signals from the attenuator 33 are stored in a storage device 34 from which the data is retrieved in synchronism with the line scanning. For this purpose the drive means 14 is supplied with clock pulses from a clock pulse generator 35 to move the scanning point in step therewith. The clock pulse is also fed to a counter 36 which provides an output when a number of line scans is completed by counting the clock pulses. The output from the counter 36 is connected to the storage device 34 to instruct it to shift the stored location to another to read out the macroscopic data appropriate for the area of the print being scanned by microscopic scanner 12. When the print image is a uniform pattern, an integrator 37 may be employed to integrate the input signals as the macroscopic scanner 13 is scanned across the surface of the print to generate data which is analogous to that obtained from the entire area of the print as provided by the macroscopic color separator 13 of the previous embodiment. In this mode of operation, switches 31 and 32 are operated to switch the paths of incoming signals to the integrator 37 which feeds its outputs to an attenuator 38 to demultiply the input values by the area (S) of the print 11, and thence to the computing circuit 22.

Figure 5C:
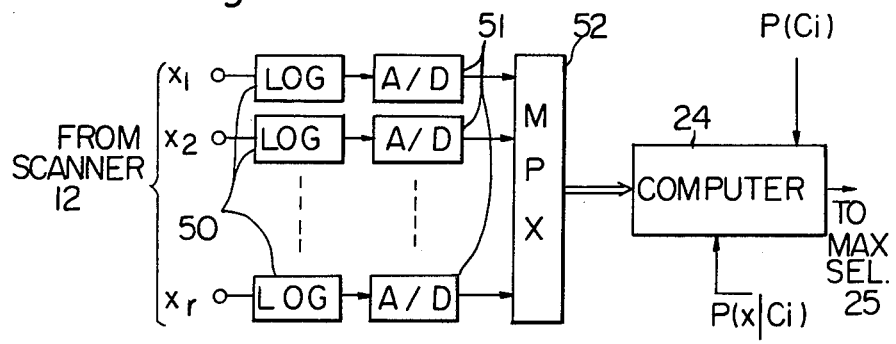
FIGS. 5C and 5D are examples of a converter which may be employed in the circuit of FIG. 1.
Figure 5D:
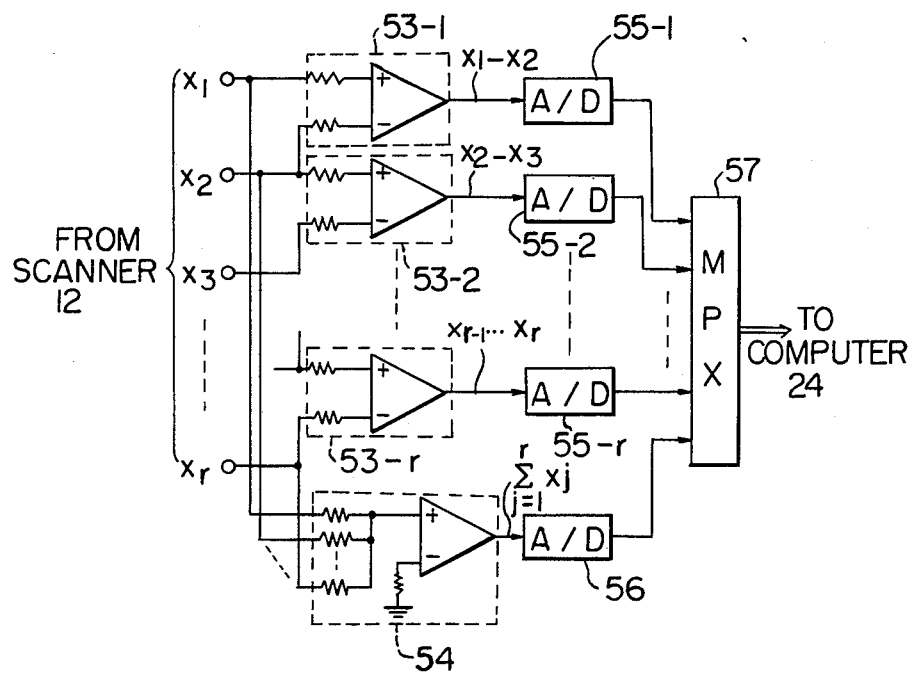

The elemental (dot) area representative signals from scanner 13 may be applied to logarithmic amplifiers 50 as shown in FIG. 5C to generate output signals which are a logarithmic function of the input signals, and thence to analog-digital converters 51. The digitally converted signals are multiplexed through a multiplexer 52 and applied to the computer 24. FIG. 5D shows a circuit which eliminates noise contaminating the dot-area representative signals. The input signals are applied to a group of differential amplifiers 53. The amplifier 53-1 has its noninverting input connected to receive signal $x_1$ and its inverting input connected to receive signal $x_2$ to generate an output which represents the difference between the two input signals so that the noise which is common to the input signals are cancelled. Similarly, the second amplifier 53-2 has its noninverting input connected to receive signal $x_2$ and its inverting input connected to receive signal $x_3$ so that the color difference output therefrom is representative of the difference $x_2$ and $x_3$. An adder 54 is provided which has its noninverting input connected to receive all the signals $x_1$ to $x_r$, while its inverting input connected to a reference or ground potential. The output from the amplifier 54 is a summation of all the input signals to represent luminance value of the dot area. The outputs from the differential amplifiers 53 and the adder 54 are applied to a group of analog-to-digital converters 55 and 56, and applied to the computer 24 through multiplexer 57. The effect of the luminance signal is to separate the colors of the same hue, but of different luminosity.

Figure 6:
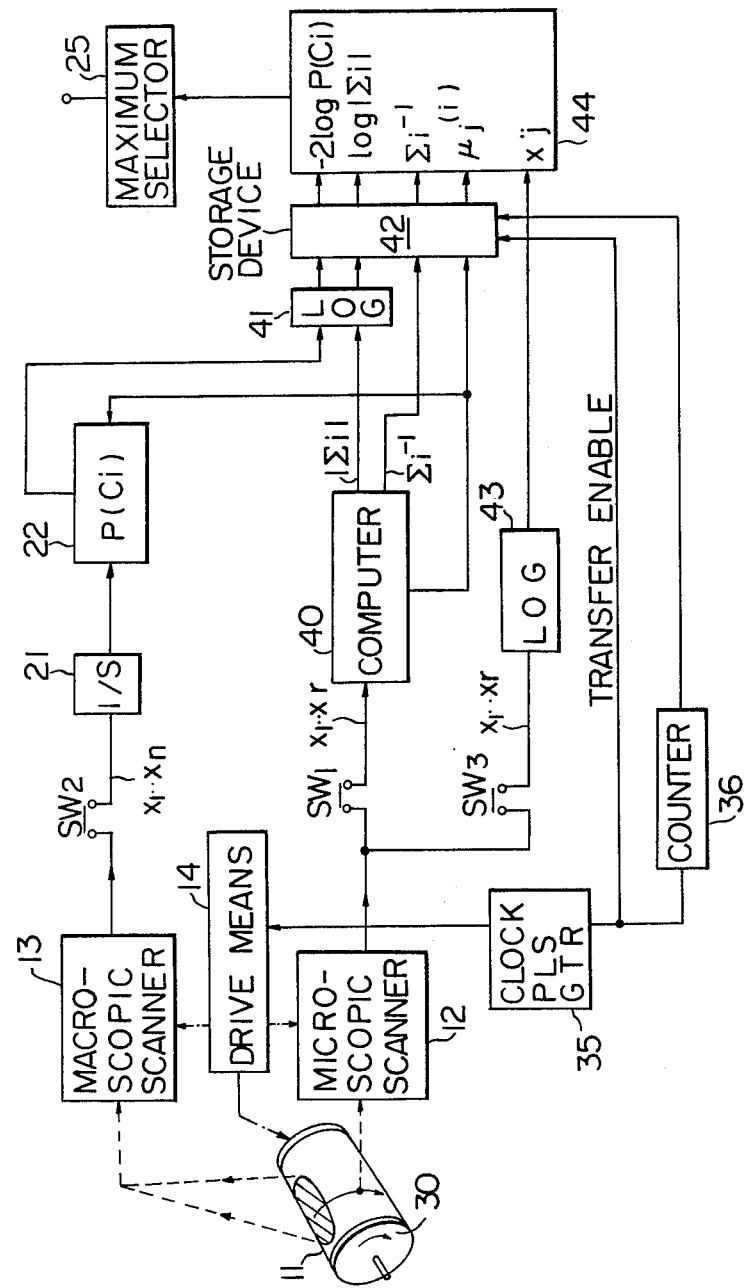
FIG. 6 is a specific embodiment of the invention.

FIG. 6 illustrates a specific embodiment of the invention wherein the same numbers are used to designate parts employed in the previous drawings. In this embodiment, the conditional probability density function is assumed to follow normal density function (Gaussion distribution) of multiple random variables which is given by Equation 11:

$$p(x|C_i) = \frac{1}{\sqrt{2(\pi)^r |\Sigma i|}} \exp\left\{-\frac{1}{2}(x - \mu^{(i)})\Sigma i^{-1}(x - \mu^{(i)})^t\right\} \quad (11)$$

where, $\Sigma i$ is the matrix of covariance of $x$ belonging to $C_1$, $\Sigma i$, the inverse matrix of said covariance, and "$t$" represents the transposition of vector $(x - \mu^{(i)})$.

By substituting the Bayes' formula $P(C_i)p(x|C_i)$ and taking its logarithm, the Bayes' formula can be given by $$\log P(C_i) + f(x) \quad (12)$$

where, $$f(x) = -\frac{1}{2}(x - \mu^{(i)})\Sigma i^{-1}(x - \mu^{(i)})^t - -\frac{1}{2}\log|\Sigma i| \quad (13)$$

if, $$\log P(C_i) + f(x) > \log P(C_j) + f(x) \quad (14)$$

$$(j = 1, 2, \ldots, n, j \neq i)$$

"$x$" can be regarded as belonging to color sample $C_i$.

In order to compute Equation 13, the matrix of covariance "$x$" and its inverse matrix should be computed, which are given as follows:

$$\Sigma i = \begin{pmatrix} s_{11} & s_{12} & \cdots & s_{1r} \\ s_{21} & s_{22} & \cdots & s_{2r} \\ \vdots & & \ddots & \vdots \\ s_{r1} & s_{r2} & \cdots & s_{rr} \end{pmatrix} = [s_{lm}] \quad (15)$$

$$l, m = 1, 2, \ldots r$$

where, the elements $s_{lm}$ are given by $$s_{lm} = \frac{1}{N} \sum_{k=1}^{N} (_k x^{(i)}{}_l {}_k x_m{}^{(i)}) - \mu_l{}^{(i)} \mu_m{}^{(i)} \quad (16)$$

where, "$k$" is the "$k$"th sample collected from the color samples or from the original print, and "$N$" is the number of such samples. Then, $$\Sigma i^{-1} = \begin{pmatrix} \sigma_{11} & \sigma_{12} & \cdots & \sigma_{1r} \\ \sigma_{21} & \sigma_{22} & \cdots & \sigma_{2r} \\ \vdots & & \ddots & \vdots \\ \sigma_{r1} & \sigma_{r2} & \cdots & \sigma_{rr} \end{pmatrix} = [\sigma_{lm}] \quad (17)$$

In FIG. 6, the apparatus has three mode selector switches SW1 to SW3. In the first mode of operation, SW1 is operated to connect the dot-area representative signals to a computer 40 to first generate the mean values $\mu$ and applies them to a storage device 42 and then proceeds to perform computation of Equations 15 to 17 through a number of processing steps as illustrated in the flow chart of FIG. 7A. In the latter execution, computer 40 first executes the step 1 to generate covariance of "$x$", and then arranges the generated covariances in a matrix form in step 2. This matrix of covariance is used in step 3 to compute the determinant $|\Sigma i|$ and applies it to a logarithmic amplifier 41. The computer 40 then proceeds to determine the inverse matrix of covariance of "$x$" ($\Sigma i^{-1}$) and feeds the result of computation to the storage device 42.

In the second mode of operation, switch SW2 is depressed to supply the output from the macroscopic scanner 13 to the computer 22 through attenauator 21. Computer 22 also receives the mean value data $\mu$ from the computer 40 so that it can proceed to execute computation of $P(C_i)$ in a manner as previously described, and feeds its resultant output to the logarithmic amplifier 41 and thence to the storage device 42. It is obvious that computers 22 and 40 may be provided by a single computer unit. The storage device 42 is thus loaded with the data required to perform calculation of Equation 13 and is ready to transfer the stored information to a computing circuit 44 in synchronism with clock pulses supplied from the clock pulse generator 35. Since the data on probability $P(C_i)$ may vary from area to area, the storage device 42 identifies the stored $P(C_i)$ data with the signal from the counter 36 so that in the transfer mode the counter output serves to shift the storage locations.

In the third mode, switch SW3 is operated to connect the output from the microscopic scanner 12 to the computing circuit 44 via a logarithmic amplifier 43, and at the same time the data stored in the storage device 42 are transferred to the circuit 44. FIG. 7B illustrates the computing circuit 44 in detail. The signals $x_1$ to $x_r$ from the microscopic scanner 12 are each applied to one input of substractors $S_1$ or $S_r$ through corresponding input terminals designated by the same characters $x_1$ to $x_r$. The $\mu^{(i)}$ data transferred from the storage device 42 are each applied to the other input of the subtractors through corresponding digital-to-analog converters (D/A) such that subtractor $S_1$ provides an output representing $x_1 - \mu_1^{(i)}$, $S_2$ providing an output $x_2 - \mu_2^{(i)}$, and so on. The outputs from the subtractors $S_1$ to $S_r$ are connected to a matrix of multipliers $M_{11}$ to $M_{rr}$ which are arranged in a plurality of rows and columns in triangular form since the inverse covariance matrix is symmetrical. The inverse matrix data derived from Equation 17 are applied to one input of the corresponding multipliers through corresponding analog-to-digital converters (not shown). The output circuits of the subtractors are each connected to the other input of those multipliers arranged in a row to provide multiplication of $(x - \mu^{(i)}) \Sigma i$. The outputs from those multipliers arranged in a column are connected to a respective one of adders $A_1$ to $A_{r-1}$ to deliver the result of the multiplication to the next stage. The outputs from the adders $A_1$ to $A_{r-1}$ are then coupled respectively to one input of multipliers $M_1$ to $M_{r-1}$ and the output from each of the subtractors $S_1$ to $S_r$ is also connected to the other input of multipliers $M_1$ to $M_{r-1}$. A multiplier $M_r$ has its one input connected to the output of multiplier $M_{rr}$ and the other input connected to the output of subtractor $S_r$. An adder 60 is provided to collect data from the multipliers $M_1$ to $M_r$. The output from the adder 60 is a representation of $(x - \mu^{(i)}) \Sigma i^{-1} (x - \mu^{(i)})t$, and thus the first term of Equation 13 is completed. The log $|\Sigma i|$ data in analog quantity is supplied from the storage device 42 to an adder 61 which provides summation of this input data with the output from the adder 60 to compute Equation 13. The output data from the adder 61 is then connected to one input of an adder 62 for summation with an analog data representing 2 log $P(C_i)$ supplied from the storage device 42. The polarity of output from the adder 62 is then inverted by an inverter 63 to provide an output proportional to $f_i(x) + \log P(C_i)$ to the maximum selector 25 through output terminal 64 to detect $C_k$ which maximizes $f_i(x) + \log P(C_i)$.

It is appreciated from the foregoing description that the dot area representative sepctral data is processed in the computing circuit 44 in analog values before the scanner 12 is moved to the next dot area. It is to be noted that the logarithmic amplifier 43 may be replaced with a linear matrix converter providing Hadamard conversion or Karhunen-Loeve expansion depending upon the statistical nature of the input signals. The mean values $\mu^{(i)}$ can also be prepared directly by scanning the color samples if available. Furthermore, if probability $P(C_i)$ has a constant value such as "$1/n$", the minimax principle may be used to identify the color of the elemental area instead of using the Bayes' Rule.

The arrangement of FIG. 6 can be simplified by the use of a variable focusing spectroscopic scanner 70 as illustrated in FIG. 8. At a first range focus, the scanner 70 collects data from the elemental area to serve as the microscopic scanner and at a second range focus, the data is collected from a larger area operating as the macroscopic scanner. The scanner 70 may comprise as shown in FIG. 9B a variable range focus lens system 17 for collecting light onto a plurality of color filters 72 equal in number to the color samples (in this case "$n$") to separate the incident light into "$n$" arbitrarily selected light wavelengths. The output from the photoelectrical devices 73 is therefore a set of signals $x_1$ to $x_n$ when the scanner 70 is set at the first range focus, or a set of signals $X_1$ to $X_n$ when the scanner is set at the second range focus.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An apparatus for analyzing the colors of a print painted with $n$ distinct colors $C_i$ where $i$ ranges from unity to $n$, and wherein each of the colors has a predetermined spectral reflectivity distribution having a set of mean values of reflectivities, comprising:

first means for representing the spectral reflectivity distribution of a light reflected from an elemental area of the print by electrical signals $x_1$ to $x_r$, where $x$ represents the spectral intensity $r$ representing a position in the color spectrum is an integer, and wherein the spectral intensity varies as random variables of multiple numbers in accordance with a predetermined conditional probability density function $p(x|C_i)$;

second means for representing the spectral reflectivity distribution per unit area of said print by electrical signal $X'_1$ to $X'_n$;

means for multiplying the set of $X'_1$ to $X'_n$ and the inverse matrix of said mean values of reflectivities to generate a probability $P(C_i)$ in accordance with which each of said colors occurs in said print;

means for computing the product $P(C_i)p(x|C_i)$ by substituting $x_1$ to $x_r$ for $x$; and means for detecting $C_i$ which maximizes the value of said product.

2. An apparatus as claimed in claim 1, wherein said second means comprises means for collecting light reflected from an area of the print encompassing a plurality of said elemental areas, means for separating the collected light into a plurality of spectral components, means for converting the separated spectral components into corresponding electrical signals, and means for demultiplying the magnitude of each signal by the size of said encompassing area.

3. An apparatus as claimed in claim 2, wherein said encompassing area includes the entire area of said print.

4. An apparatus as claimed in claim 2, wherein said encompassing area is a division of said print, further comprising means for causing said light-collecting means to move across the surface of said print.

5. An apparatus as claimed in claim 4, further comprising means for integrating the magnitude of each electrical signal and means for demultiplying the integrated magnitude by the size of the entire area of said print.

6. An apparatus as claimed in claim 1, wherein said electrical signals $x_1$ to $x_r$ vary in accordance with a normal density function of multiple random variables with a set of mean values $\mu_j^{(i)}$ where $j$ is an integer between unity and $r$, and wherein said computing means comprises:
- means for providing the difference between $x$ and $\mu_j^{(i)}$;
- means for multiplying said difference by an inverse matrix of a covariance of $x$;
- means for determining a logarithm of the determinant of the matrix of said covariance;
- means for determining a logarithm of $P(C_i)$; and
- means for providing summation of the result of the multiplication, the logarithm of the determinant and the logarithm of $P(C_i)$.

7. An apparatus as claimed in claim 6, wherein said multiplying means comprises an array of first multipliers arranged in a plurality of rows and columns, those multipliers arranged in a row having their first inputs connected in common to receive the difference between $x$ and $\mu_j^{(i)}$ and their second inputs receptive of electrical quantities representing the inverse matrix of the covariance of $x$, a set of first adders each providing summation of the signals from the outputs of those multipliers arranged in a column, a set of second multipliers each having a first input connected to the first inputs of said first multipliers arranged in a row and a second input connected to the output of each of said first adders, and a second adder providing summation of the outputs from said second multipliers.

8. An apparatus as claimed in claim 7, wherein said first multipliers are arranged in a triangular array of rows and columns.

9. An apparatus as claimed in claim 1, wherein said multiplying means comprises a set of multipliers having their first inputs connected to receive the signals $X'_1$ to $X'_n$, respectively, and their second inputs connected to receive electrical quantities representing a row of said inverse matrix of the mean reflectivity values, and means connected to the outputs of said multipliers to provide summation of the results of the multiplications.

10. An apparatus as claimed in claim 1, further comprising means for modulating the signals $x_1$ to $x_r$ in accordance with a logarithmic function.

11. An apparatus as claimed in claim 1, further comprising a plurality of differential amplifiers each having first and second inputs connected to receive successive ones of said signals $x_1$ to $x_r$ to provide an output representing the difference between the successive spectral components, and means for providing summation of said signals $x_1$ to $x_r$ to provide an output representing the luminous intensity of the light reflected from said elemental area.

12. An apparatus as claimed in claim 1, wherein said first means comprises means for collecting light reflected from the elemental area of the print, means for separating the collected light into a plurality of spectral components, means for moving the light-collecting means relative to the surface of said print to scan along a plurality of line paths within the print, and means for converting the separated spectral components into electrical signals, further comprising means for generating clock pulses for causing said moving means to move said light-collecting means from one elemental area to another in step with each clock pulse, means for converting the conditional probability density function $p(x|C_i)$ into first electronic data, means for converting the probability $P(C_i)$ into second electronic data, and means for storing said first and second electronic data, said storing means being connected to said clock pulse generating means to transfer its contents to said computing means in step with each clock pulse so that the computation of the product $P(C_i)p(x|C_i)$ is completed for each set of signals $x_1$ to $x_r$ generated from said first means corresponding to one elemental area in time before said light-collecting means is moved to the next elemental area.

13. An apparatus for analyzing the colors of a print painted with N distinct colors $C_i$ where $i$ ranges from unity to N, and wherein each of the colors has a predetermined spectral reflectivity distribution which substantially follows a normal density function of multiple random variables, said apparatus comprising:
- a variable range focus lens system for collecting light reflected from an elemental area of the print and a larger area encompassing a plurality of such elemental areas;
- means for separating the collected light into a plurality of spectral components;
- means for converting the separated spectral components into corresponding first electrical quantities $x_1$ to $x_n$ when said lens system is at a first range focus to provide collection of light from the elemental area and into second electrical quantities $X_1$ to $X_n$ when said lens system is at a second range focus to provide collection of light from the larger area;
- means for demultiplying the second electrical quantities $X_1$ to $X_n$ by the size of said larger area to derive third electrical quantities $X_1'$ to $X_n'$ representing the spectral reflectivity per unit area of the larger area;
- means coupled to said converting means for generating fourth electrical quantities $\mu_1^{(i)}$ to $\mu_n^{(i)}$ representing a set of mean values of said first electrical quantities $x_1$ to $x_n$;
- first means for mathematically manipulating said fourth electrical quantities to produce an inverse matrix of said fourth electrical quantities;
- means for multiplying said third electrical quantities $X_1'$ to $X_n'$ by said inverse matrix to generate fifth electrical quantities representing a probability $P(C_i)$ in accordance with which of said colors appears in said print;
- second means for mathematically manipulating said fifth electrical quantities with a conditional probability density function $p(x|C_i)$ by substituting $x_1$ to $x_n$ for $x$ to produce products $P(C_i)p(x_1|C_i)$ to $P(C_i)p(x_N|C_i)$; and
- means for detecting a $C_i$ which maximizes the value of said products.

14. An apparatus as claimed in claim 13, wherein said second mathematically manipulating means comprises:
- a computer programmed to determine a covariance of said first electrical quantities $x_1$ to $x_n$ for presentation in a matrix form, provide the determinant of said matrix of the covariance, and generate an inverse matrix of said covariance; and
- an electronic circuit comprising:

means for providing the difference between said first and fourth electrical quantities:

means for multiplying said differences by the inverse matrix of said covariance;

means for providing a logarithm of said fifth electrical quantities representing $P(C_1)$; and means for providing summation of the results of the multiplication the logarithm of said determinant and the logarithm of $P(C_j)$.

15. An apparatus as claimed in claim 14, further comprising means for generating clock pulses, means for moving said lens system relative to the print such that the area from which the light is collected is moved from one elemental area to another in step with each clock pulse, means for storing said fourth electrical quantities representing $\mu_1^{(i)}$ to $\mu_n^{(i)}$, the inverse matrix of said covariance, the logarithm of said determinant, and the logarithm of $P(C_j)$, and means to transfer the stored contents of said means for computing the product $P(C_j) p(x|C_j)$ so that the computation of said product is completed for each of said first electrical quantities $x_1$ to $x_n$ derived from one elemental area in time before said lens system is moved to the next position.

16. An apparatus as claimed in claim 14, wherein said multiplying means comprises an array of first multipliers arranged in a plurality of rows and columns, those multipliers arranged in a row having their first inputs connected in common to receive physical quantities representing said differences and their second inputs receptive of electrical quantities representing a row of the inverse matrix of said covariance, a set of first adders each providing summation of the outputs from those multipliers arranged in a column, a set of second multipliers each having a first input connected to the first inputs of said first multipliers arranged in a row and a second input connected to the output of each of said first adders, and a second adder providing summation of the outputs from said second multipliers.

17. An apparatus as claimed in claim 16, wherein said first multipliers are arranged in a triangular array of rows and columns.

18. A method for analyzing a print painted with $n$ different colors $C_i$ to form a colored pattern, where $i$ ranges from unity to $n$, wherein each of the areas painted with a same color has a particular intensity distribution in the color spectrum with a tendency to vary as random variables from a distribution of mean values in accordance with a predetermined conditional probability density function $p(x|C_i)$ where $x$ represents the spectral intensity of an elemental area, and each of the painted areas of the same color has a probability of occurrence $P(C_i)$ in said print, comprising:

placing said print with respect to a first optical system;

collecting spectral information from a predetermined area within said print with said optical system;

selectively filtering said collected spectral information to produce macroscopic spectral data of said predetermined area;

converting said macroscopic spectral data into macroscopic electronic data;

demultiplying the converted data by the size of said predetermined area to produce electronic data representing spectral data per unit area of said predetermined area;

mathematically manipulating said demultiplied electronic data and said mean values to determine said probability $P(C_i)$;

placing said print with respect to a second optical system;

scanning said print with said second optical system along each of a plurality of line paths;

selectively filtering the output from said second optical system to produce microscopic spectral data representing said spectral intensity $x$;

converting said microscopic spectral data $x$ into microscopic electronic data $x$;

mathematically manipulating said conditional probability density function $p(x|C_i)$ with said converted electronic data $x$ to determine the conditional probabilities of said electronic data $x$ given that said data $x$ belong to a said $C_i$ and manipulating said probability $P(C_i)$ with said conditional probabilities to produce a set of products of said probability and said conditional probability; and detecting a $C_i$ which maximizes said products.

19. A method as claimed in claim 18, wherein said probability $P(C_i)$ is $1/n$.

20. S method as claimed in claim 18, wherein the conditional probability density function $p(x|C_i)$ is a normal density function of multiple random variables $x$.

21. A method as claimed in claim 18, wherein the product is obtained by the steps of:

computing the covariance of $x$;

computing the matrix of said covariance;

computing the inverse matrix of said covariance;

computing the determinant of the matrix of said covariance;

computing the logarithm of the determinant;

computing the logarithm of $P(C_i)$;

computing the differences between said means values and x;

computing a product of said differences and said inverse matrix;

computing a product of said product and the transposition of the vector of said differences; and computing the summation of the last-mentioned product and said logarithm of the determinant and said logarithm of $P(C_i)$.

22. A method as claimed in claim 18, further comprising the step of modulating the detected intensities of the spectral components such that the modulated intensities are a logarithmic function of the detected intensities $x$.

* * * * *